3,741,929
INORGANIC FLAMEPROOFING COMPOSITION FOR ORGANIC MATERIALS

Pearl Burton, Leominster, Mass., assignor to International Telephone and Telegraph Corporation, New York, N.Y.
No Drawing. Continuation-in-part of application Ser. No. 880,467, Dec. 8, 1969, which is a continuation of application Ser. No. 679,210, Oct. 30, 1967, which in turn is a continuation of application Ser. No. 391,004, Aug. 20, 1964, all now abandoned. This application Apr. 6, 1971, Ser. No. 131,815
Int. Cl. C08f 45/04; C08g 51/04; C09k 3/28
U.S. Cl. 260—40 R          5 Claims

ABSTRACT OF THE DISCLOSURE

A flame retardant insulation material is formed of a non-halogenated composition which is relatively stable when exposed to irradiation. The composition includes an organic high polymeric plastic material such as polyethylene, an inorganic hydrate such as aluminum hydrate, an inorganic filler such as antimony trioxide and an antioxidant.

---

This invention relates to flameproofing or flame retardant compositions particularly for use in insulating metallic electrical conductors. More particularly, it relates to non-halogenated polymeric flameproofing compositions which are relatively stable when subjected to irradiation.

The present application is a continuation-in-part of my copending application, Ser. No. 880,467, filed Dec. 8, 1969 now abandoned which was a continuation of application Ser. No. 679,210, filed Oct. 30, 1967 (now abandoned), which in turn was a continuation of application Ser. No. 391,004, filed Aug. 20, 1964 (now abandoned).

Resinous or polymeric flameproofing compositions containing halogenated materials have been employed previously for the purpose of electrical insulating coating. However, a distinct problem of long standing has been encountered when these compositions have been used for electrical insulation of wires or metal parts such as electrical conductors where the compositions are subjected to irradiation in order to achieve cross-linking and to provide a desired heat resistant property to the insulation. These halogen containing compositions have been found to react to irradiation by releasing the halogen and this in turn causes corrosion of the metal, apparently as a result of the reaction between the halogen and metal oxides. Furthermore, the release of halogen degrades the flameproofing composition so that its heat resistance properties are greatly impaired. Thus, it would be highly desirable and economically important to provide a flameproofing composition for insulation coating of metal parts, electrical conductors, and wires which would eliminate the corrosion and degradation problems caused by irradiation of halogen containing resinous or polymeric flameproofing insulation compositions.

Accordingly, an object of this invention is to provide new and improved flameproofing compositions containing organic plastic, resinous or polymeric materials. In this regard, it is an object to provide fire-retardant compositions, the desirable characteristics of which are not altered as a result of irradiation treatment.

Another object is to provide flameproofed compositions including only nonhalogenated materials, the composition being relatively stable upon exposure to irradiation.

Additional objects if not specifically set forth herein will be readily apparent to those skilled in the art from the following detailed description of the invention.

The present invention imposes substantially no restrictions or limitations upon the processing or fabrication of the organic resinous materials. Conveniently, the flameproofing compositions of the present invention may be prepared by mixing completely polymerized materials with a flameproofing material while the former is in particle form. Such completely polymerized organic materials with the flameproofing material admixed may be combined thereafter with other suitable materials and formed into products as desired. No extraordinary steps are required in obtaining the ultimate combination of the ingredients; each may be added separately to the organic plastic materials, or all may be added at one time.

After the ingredients have been combined, the resulting flameproofing composition is subjected to irradiation normally subsequent to extrusion of the composition into the desired size and shape such as tubing or wire insulation. Irradiation is performed in accordance with well known techniques such as are described in U.S. Pat. Nos. 2,981,668, issued Apr. 25, 1961 and 3,239,482, issued Mar. 8, 1966, in order to provide a crosslinked polymeric composition.

As examples of the organic plastic constituent of the flameproofing compositions of this invention, may be mentioned non-halogenated natural and synthetic plastic materials, such as some natural and synthetic rubbers, non-halogenated polyethylene and the various non-halogenated polyester resins, and the like. The invention extends to the above organic resinous materials as well as copolymers thereof with themselves and other materials. The invention, however, is applicable to other non-halogenated organic plastic materials, which are non-reactive under irradiation, and the above specifically mentioned examples of organic plastic materials with which the compositions of the invention may be combined are given for purpose of illustration for those skilled in the art. The terms "resinous," "plastic" and "polymeric," as used herein, are to be regarded as synonomous and to extend to any or all of the numerous high molecular-weight-forming or high molecular weight organic materials generally implicit in such terms. Preferably, the molecular weight of the polymeric constituent should be in the range of about 15,000 to about 100,000.

The flameproofing composition of this invention comprises a mixture of an organic high molecular weight polymeric plastic material selected from the group consisting of non-halogenated polyester resins, and non-halogenated polyethylene, combined with 7.2–61% by weight of an inorganic hydrate, 4.2–30% of an inorganic filler material and 0.07–9.1% of an antioxidant. This invention utilizes aluminum hydrate or hydroxide ($Al_2O_3 \cdot 3H_2O$) which is very stable when exposed to irradiation either by high energy electrons, alpha rays, gamma rays or X-rays. By contrast, chlorinated hydrocarbons, such as for example chlorinated wax which is used in prior art flameproofing compositions, give off chlorine atoms when exposed to irradiation, which attack the metals that are covered by the flameproofing insulating compositions. Furthermore, since the aluminum hydrate is stable, no stabilizer is required. It is believed that the aluminum hydrate when heated to the flame temperature of the plastic materials gives off water vapor which tends to quench the flame. The antioxidant used in the flameproofing composition is preferably that sold under the trade name "Santonox R" manufactured by Monsanto Chemical Corporation and having essentially the formula 4,4'-thiobis' (6-tertiary butyl m-cresol). Another particularly suitable antioxidant is 4,4'-thiobis' (6-tertiary butyl phenol). The preferred filler is a material, such as antimony trioxide, $Sb_2O_3$. However, while examples of the antioxidant and filler materials have been given, other materials of like properties will suggest themselves to those skilled in the art.

In the examples set forth hereinafter, the polyethylene and other materials to be incorporated in the flameproofing composition were put in a Banbury mixer and thoroughly mixed. The mixture was heated and at a temperature of about 250° was dropped onto a two roll mill and a sheet was formed. Subsequently, the sheet was diced into 1/8" cubes and extruded through a standard screw extruder (usually a 2½" screw size) at about 370° F. into the desired size and shape such as tubing or wire insulation. The resulting shaped compositions were then subjected to irradiation sufficient to cause crosslinking by a process as described in the aforementioned U.S. patents.

All of the compositions enumerated in the following examples were subjected to a flame test in accordance with the specification MIL–I–3190A. In accordance with this specification at least three specimens approximately four inches in length were cut from the sample materials and a gage length of one inch marked on each specimen approximately ½ inch from one end. The end of each specimen was then inserted into the side of the flame of a Bunsen burner with the lower side of the specimen approximately ½ inch above the top of the burner and then rotated in the flame to ignite it as uniformly as possible. The specimen was then removed from the flame and held vertically, the burning end uppermost, in still air. When the leading edge of the flame reached the upper gage mark, a stop watch was started and the time in seconds for the leading edge of the flame to travel down the specimen to the lower gage mark was observed. The requirements of the MIL specification is that the rate of burning should not be faster than 1" in 45 seconds. Another requirement is the same test except that the flame shall be self-extinguishing in 4 inches.

EXAMPLE I

The following materials were thoroughly mixed and milled, heated, extruded in the form of tubing and irradiated at a dosage of 30 megarads:

| | Parts by weight |
|---|---|
| Polyethylene (M.W.—24,000) | 100 |
| Aluminum hydrate | 5 |
| Antimony trixodie | 5 |
| 4,4'-thiobis' (6-tertiary butyl m-cresol) | 0.1 |

The flame test result was a burning rate of 15 seconds/inch.

EXAMPLE 2

The following materials were thoroughly mixed and milled, heated, extruded in the form of tubing and irradiated at a dosage of 30 megarads:

| | Parts by weight |
|---|---|
| Polyethylene (M.W.—24,000) | 100 |
| Aluminum hydrate | 100 |
| Antimony trioxide | 50 |
| 4,4'-thiobis' (6-tertiary butyl m-cresol) | 0.1 |

The result of the test established no burning rate since it was self-extinguishing within 1 inch.

EXAMPLE 3

The following materials were thoruoghly mixed and milled, heated, extruded in the form of tubing and irradiated at a dosage of 30 megarads:

| | Parts by weight |
|---|---|
| Polyethylene (M.W.—24,000) | 100 |
| Aluminum hydrate | 25 |
| Antimony trioxide | 20 |
| 4,4'-thiobis' (6-tertiary butyl m-cresol) | 3 |

The flame test result was a burning rate of 50 seconds/inch and it was self-extinguished within 5 inches.

EXAMPLE 4

The following materials were thoroughly mixed and milled, heated, extruded in the form of tubing and irradiated at a dosage of 30 megarads:

| | Parts by weight |
|---|---|
| Polyethylene (M.W.—24,000) | 100 |
| Aluminum hydrate | 40 |
| Antimony trioxide | 13 |
| 4,4'-thiobis' (6-tertiary butyl m-cresol) | 6 |

The flame test results showed a burning rate of 60 seconds/inch and self-extinguishing in 3 inches.

In all cases it was found that the improvement in heat resistance of this material over a standard chlorinated material is significant after 24 hours at 175° C. this material still retained its color whereas the prior art chlorinated material turned dark brown. After 96 hours at 175° C., this material remained flexible whereas the chlorinated material was brittle.

While I have described above the principles of my invention in connection with specific apparatus and formulations, it is to be clearly understood that this description is made by only by way of example and not as a limitation on the scope of my invention as set forth in the specification and in the accompanying claims.

I claim:
1. An irradiation crosslinked, non-halogenated flameproofing insulation composition for metallic electrical conductors consisting essentially of polyethylene combined with 7.2–61% (by weight) aluminum hydrate, 4.2–30% (by weight) antimony trioxide, and 0.07–9.1% (by weight) of an antioxidant selected from the group consisting of 4,4'-thiobis' (6-teriary butyl m-cresol), 4,4'-thiobis' (6 tertiary butyl phenol) and mixtures thereof.

2. A flameproofed extruded composition for insulation coating of metal parts and wires comprising an irradiation crosslinked organic high molecular weight polymeric plastic material selected from the group consisting of polyester resins and polyethylene, combined with 7.2–61% (by weight) aluminum hydrate, 4.2–30% (by weight) of antimony trioxide filler material and 0.07–9.1% of an antioxidant, said composition including only non-halogenated materials; said composition being relatively stable when exposed to irradiation.

3. The composition claimed of claim 2 wherein said antioxidant is selected from the group consisting of 4,4'-thiobis' (6 teritary butyl m-cresol), 4,4'-thiobis' (6 tertiary butyl phenol) and mixtures thereof.

4. An article comprising a metallic electrical conductor and a flameproofed, non-halogenated, irradiation crisslinked polymeric insulating composition surrounding a portion of said conductor, said insulating composition consisting essentially of polymeric plastic material selected from the group consisting of polyester resins and polyethylene, combined with 7.2–61% (by weight) aluminum hydrate, 4.2–30% (by weight) antimony trioxide filler material and 0.07–9.1% of an antioxidant.

5. The article of claim 4 wherein the antioxidant is selected from the group consisting of 4,4'-thiobis' (6 tertiary butyl m-cresol), 4,4'-thiobis' (6 tertiary butyl phenol) and mixtures thereof.

References Cited

UNITED STATES PATENTS

| 2,514,141 | 7/1950 | Phillips | 260—40 R |
| 2,611,694 | 9/1952 | Becher | 106—15 FP |

FOREIGN PATENTS

| 674,782 | 11/1963 | Canada. |

MORRIS LIEBMAN, Primary Examiner

S. L. FOX, Assistant Examiner

U.S. Cl. X.R.

106—15 FP; 117—127, 137; 260—41 B